April 25, 1933.　　　　L. C. ALLEN　　　　1,905,025
CONVEYER SYSTEM
Filed Nov. 5, 1930　　　2 Sheets-Sheet 1

INVENTOR
LAVONT C. ALLEN
by Roberts, Cushman & Woodberry
ATT'YS

April 25, 1933. L. C. ALLEN 1,905,025
CONVEYER SYSTEM
Filed Nov. 5, 1930 2 Sheets-Sheet 2

INVENTOR
LAVONT C. ALLEN
by Roberts, Cushman & Woodbury
ATT'YS

Patented Apr. 25, 1933

1,905,025

UNITED STATES PATENT OFFICE

LAVONT C. ALLEN, OF SYRACUSE, NEW YORK, ASSIGNOR TO THE LAMSON COMPANY, OF SYRACUSE, NEW YORK, A CORPORATION OF MASSACHUSETTS

CONVEYER SYSTEM

Application filed November 5, 1930. Serial No. 493,486.

This invention relates to conveyer systems of the general type comprising travelling surfaces having intersecting or adjacent courses of travel and to means for assisting in the transfer of articles from one travelling or conveying surface to another.

At points of transfer in systems of this kind the objects being transported may be subjected to shocks or to jarring sufficient to damage fragile articles, such as pieces of china for example. There is also a tendency for the articles to accumulate or jam at the transfer points and when this happens the articles do not leave a transfer point in the same spaced relation as that in which they entered it. Moreover it is frequently highly desirable not only to preserve the spaced relation of the articles but to accomplish this without turning the articles appreciably with respect to their course of travel.

Objects of the present invention are to improve systems of this general class by insuring the transfer of articles from one conveyer to another without objectionable shocks or jarring; to provide improved means for transferring articles and for maintaining the same in properly spaced relation; to provide for transferring articles while maintaining them in substantially the same relative position with respect to their course of travel; and also to provide apparatus of the class described having an improved construction and arrangement of parts.

Figure 1:
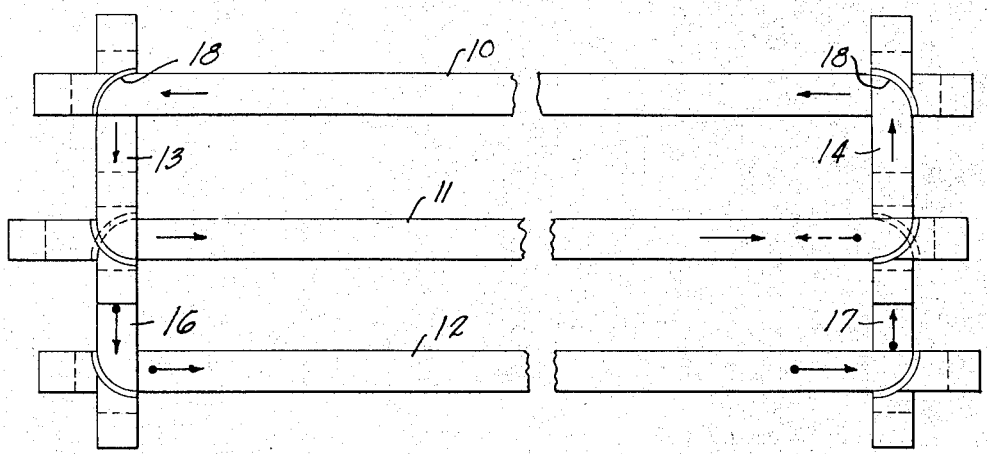
Fig. 1 is a diagrammatic plan view of a conveyer system embodying this invention.

The apparatus selected for illustration comprises endless belt conveyers 10, 11 and 12, which may be arranged to follow substantially parallel courses as shown. End conveyers 13 and 14 are arranged for conveying articles between the conveyers 10 and 11, and another set of end conveyers 16 and 17 are arranged for conveying articles between the conveyers 11 and 12. The central conveyer 11 is a two-way conveyer, the upper run of the belt of this conveyer being substantially level with the upper run of conveyer 10, while the lower run of conveyer 11 is substantially level with the upper run of conveyer 12. As will be more apparent from consideration of Fig. 2, the upper run of the end conveyer 13 passes beneath and immediately adjacent the under surface of the upper run of conveyer 10 while this same conveying surface of conveyer 13 passes above and in close proximity to the upper run of conveyer 11. In a similar manner the upper run of end conveyer 14 passes beneath and in close proximity to the under surface of the upper run of conveyer 11 and across the upper surface of the upper run of conveyer 10. The end conveyers 16 and 17 are arranged to cooperate with the conveyers 11 and 12 in a similar manner so that articles travelling in the direction of the arrows will pass at points of transfer from one conveying surface to a lower conveying surface. For assisting in transferring articles from one conveyer to another, there is provided at each point of intersection, or point of transfer, deflector apparatus indicated generally at 18 of Fig. 1.

The conveyer 10 is trained at one end over a drum 19 which is mounted upon a shaft 21, the latter being rotatably supported in bearings 22 carried by the framework indicated generally at 23. In a like manner, the conveyer 11 is trained at one end over a drum 24 which is carried by a shaft 26, the latter being rotatably mounted in bearings 27 carried by the frame work. The other end of each conveyer will be supported in a similar or suitable manner in accordance with the usual custom. The end conveyer 13 is trained over end drums 28 and 29 which are carried by shafts 31 and 32 rotatably supported in bearings 33 and 34 mounted on the framework. The end conveyer 13 is operated from the shaft 26 of conveyer 11, the shaft 32 being extended to a position adjacent to shaft 26 and power being transmitted between these shafts by means of bevel gearing 36. The other end conveyers 14, 16 and 17 may be operated from one of the main conveyers 10, 11 or 12 in a similar manner.

Figure 4:
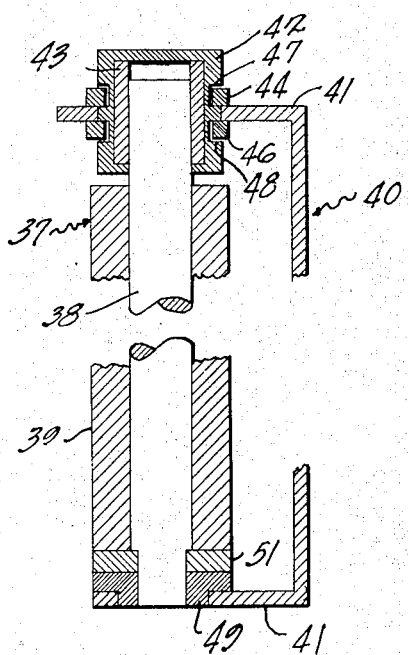
Fig. 4 is a vertical section through one of the deflectors taken on the line 4—4 of Fig. 2.
Figure 5:
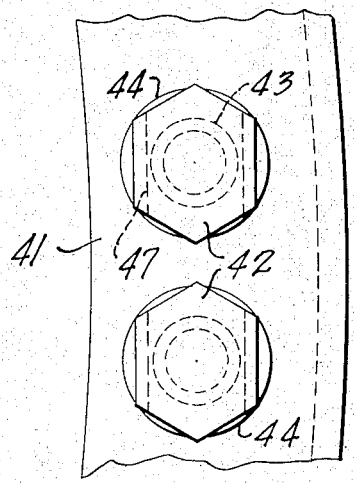
Fig. 5 is a plan view of a portion of frame of the deflector apparatus illustrated in Fig. 4.

The deflector mechanism 18 for each transfer point is in the form of a live roller section comprising a series of closely adjacent, vertically disposed, yieldable and preferably elastic or resilient rollers 37 which are arranged in an arcuate path at the points of transfer. As shown in Fig. 4, the individual rollers may comprise a central rotary shaft 38 and an outer tube 39 of rubber or other suitable material. This shaft is supported in a frame 40 of channel section by means of an upper bearing comprising the bearing cap 42 which may be pressed or otherwise secured in an opening in the upper flange 41 of the frame and which is fitted with a bushing 43 to receive the upper end of the rotary shaft. Retaining rings 44 and 46 are adapted to be snapped into upper and lower circumferential grooves 47, 48 for retaining the bearing cap 42 in position in the frame. The lower end of the shaft 38 may be reduced and disposed in a lower washer or bushing 49 which fits snugly in the lower flange 41' of the frame. An upper washer 51 rests on the lower washer and fits about the shaft to provide a bearing for the lower end of the tubular member 39. This arrangement provides a compact and yet a rugged and durable construction which makes it possible to extend the yieldable or elastic portion 39 of each roller closely adjacent to the plane of the conveying surface with which the particular roller cooperates. Hence it is assured that the soft, yieldable portion 39 of each roller will engage relatively flat articles, such as plates, saucers, and the like as well as articles of greater height.

Figure 2:
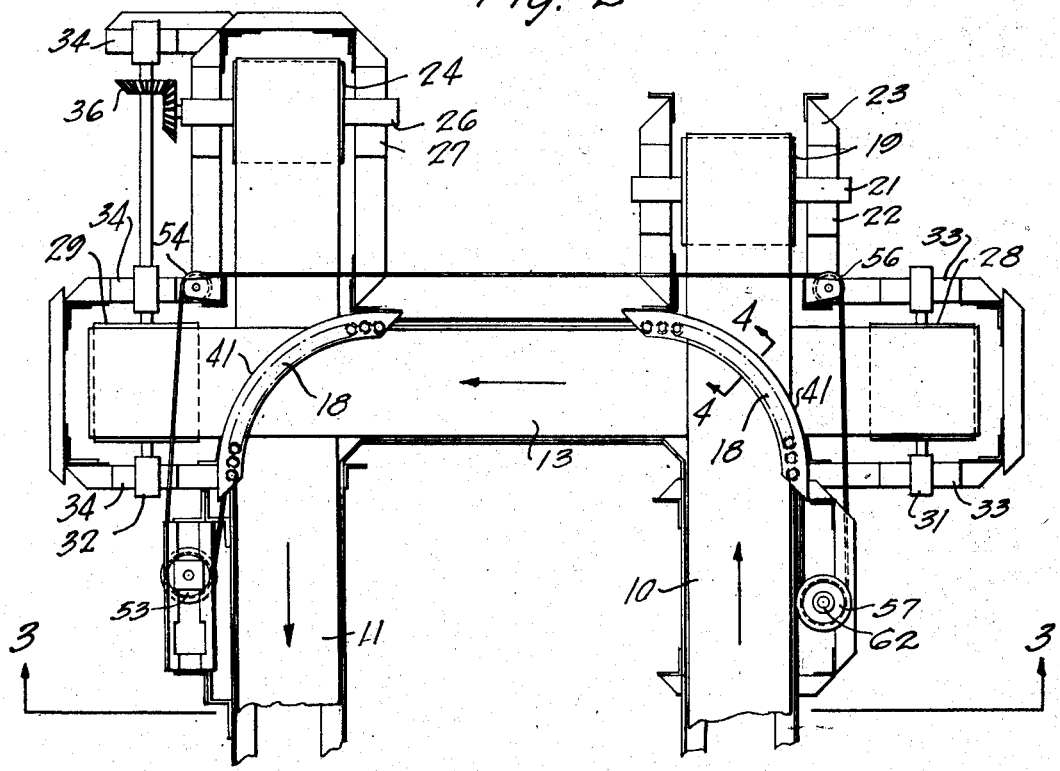
Fig. 2 is a plan view with parts omitted showing a portion of the end construction of the system illustrated in Fig. 1.
Figure 3:
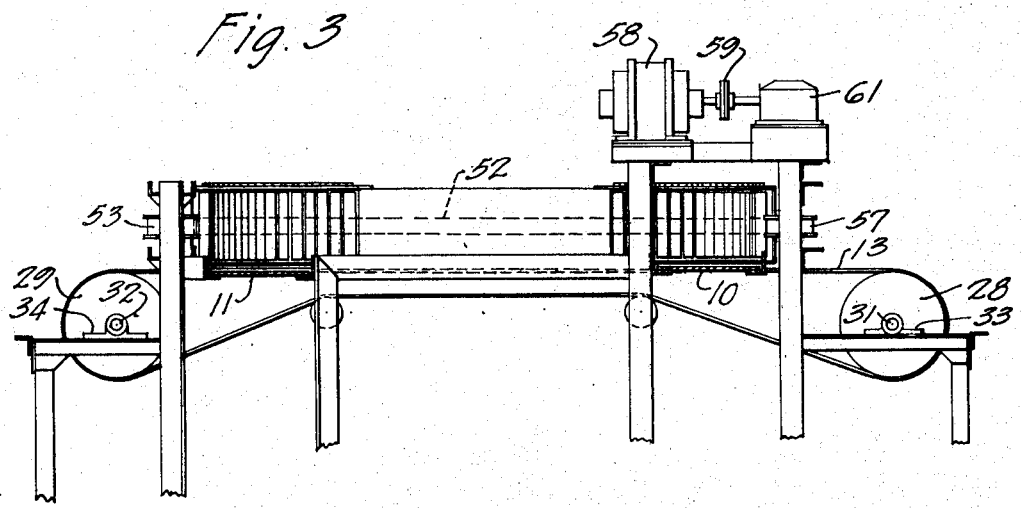
Fig. 3 is a section taken substantially along the line 3—3 of Fig. 2.

These rollers are so positioned with respect to the frame as to provide sufficient space between the web of the latter and the cylindrical surfaces of rollers to accommodate an endless belt 52 (Figs. 2 and 3). This belt is trained over idler pulleys 53, 54 and 56 which are supported in the frame and also over a driving pulley 57. These pulleys are arranged to hold the inner run of driving belt 52 in operative engagement with the tubular members 39 which cooperate with conveyers 10 and 11 and end conveyer 13. It will be understood that at other points of transfer the deflectors 18 are arranged and operated in a similar manner. A driving motor 58 (Fig. 3) is connected by a coupling 59 to a speed change unit 61 and the latter is arranged to transmit power to the shaft 62 on which the driving pulley 57 is keyed.

In the operation of the apparatus the driving belt 52 is operated at a slightly higher rate of speed than the conveyer belts 10 and 11. With the particular system illustrated, the lower run of the belt of the two-way conveyer 11 is intended to receive the unfinished product from conveyer 12 and this product is carried in the direction indicated by the dotted arrow until it is removed by operators to be finished. The upper run of this two-way conveyer receives the finished product from operators, and delivers this product by means of the deflector mechanism and the end conveyers to the conveyer 10 where it is received by packers. Articles which are not removed from either of these conveyers continue to recirculate until such time as an attendant is ready to remove same.

As articles, such as pieces of china, for example, are transported by one of the conveyers to a transfer point they are brought into engagement with the relatively soft, yieldable rotating surfaces of the rollers and the latter tend to grip the pieces or articles contacting therewith. As the peripheral speed of the rollers is greater than that of the belt on which articles are approaching this station, the yieldable or gripping engagement of the rollers together with the greater speed of the latter cooperate to tend to pull articles around to the desired station, as from conveyer 10 to conveyer 13. The operating speeds of the rollers and of the conveyers are so regulated that the articles passing through a transfer point are only turned through a sufficient angle to maintain these articles in the same relative position with respect to their course of travel. This is a very important feature especially where apparatus of this kind is used for conveying fragile articles, as in a pottery where it is not permissible to turn pieces of china while in transit in the system. The conveying belts are also relatively thin or "small ply" belts so that as an article passes from conveyer 10 to conveyer 13, for instance, there will be only a slight drop to the receiving conveyer and consequently it is assured that such article will not be damaged by shock or jarring at this point. It will also be observed that at each transfer point the articles pass from a higher to a lower conveyer and thus avoid impacts which would otherwise be produced on direct engagement with the edge of a belt should transfer be attempted from a lower to a higher conveyer.

The action of the rotating rollers in engaging an article causes the latter to turn about a vertical axis so that at no time during transfer is an article pushed along a diameter of its base. An article having a circular base, for example, is subjected to a pressure acting along a chord of its base and variously shaped articles are turned in a similar manner. Engagement of articles with the rollers is also made more gentle by the illustrated arrangement in which the rollers are disposed along an arcuate path so that their article-engaging surfaces constitute in effect a travelling concave wall. Hence as an article advances along this travelling concave wall the action of each individual roller is only to move or turn such article to a relatively slight extent and the possibility of any objectionable impact even against the soft rollers is thereby precluded.

While it is contemplated that in some cases where conditions render this feasible the rollers may be arranged in a straight or substantially straight course rather than along an arc as shown it will be clear that when the former arrangement is employed the articles will be subjected to greater internal strains and also to a more direct pushing action as well as to more severe impacts even against the soft rollers. Obviously these latter conditions should be avoided when handling more fragile articles, such as pieces of china in the course of manufacture thereof. A further important advantage resulting from the arcuate or concave arrangement of the rollers is that articles having substantially the same width of the conveyer may pass through the transfer stations as readily as smaller articles without any danger of jamming.

Another important feature of this invention is that of having the rotating rollers arranged to extend across the edge of the approaching conveyer, as conveyer 10, and along the receiving conveyer, as conveyer 13. As articles pass over the edge of conveyer 10 for instance, the gripping action of the rollers with which they are engaged tends to support such articles so as to ease them down gently over the edge of conveyer 10 onto conveyer 13, thereby avoiding any abrupt drop and the impact or jarring incident thereto.

While one embodiment only of this invention has been shown and described herein it will be understood that I am not limited thereto and that other embodiments may be made without departing from the spirit and scope of the invention as set forth in the following claims.

I claim:

1. Conveying apparatus comprising a plurality of belt conveyers having intersecting courses of travel and having their adjacent surfaces contiguous at intersections of their courses of travel, live roller deflector mechanism at intersections of their courses of travel comprising a series of closely adjacent vertically disposed live rollers arranged in an arcuate path extending approximately diagonally across the intersection, frames for rotatably supporting the rollers in this position, and an endless belt in operative engagement with the rollers of the deflector mechanism of at least two intersections for operating such rollers.

2. The combination with conveyer belts having intersecting courses of travel and arranged with their adjacent conveying surfaces contiguous at the intersection, the surface of one belt traveling in a plane below that of the other belt, of deflector rollers disposed approximately normal to the surfaces of the belts in a substantially arcuate path extending at the intersection of the courses of travel across the upper belt and along the side of the lower belt, and an endless belt which frictionally bears upon the rollers and rotates them whereby articles advanced by the upper belt are transferred to the lower belt.

3. The combination with conveyer belts having intersecting courses of travel and arranged with their adjacent conveying surfaces contiguous at the intersection, the surface of one belt traveling in a plane below that of the other belt, of deflector rollers disposed approximately normal to the surfaces of the belts in a substantially arcuate path extending at the intersection of the courses of travel across the upper belt and along the side of the lower belt, and an endless belt, which bears upon the outer surfaces of the rollers and is constrained thereby to follow the arcuate path, for rotating said rollers whereby articles advanced by the upper belt are transferred to the lower belt.

4. The combination with conveyer belts for transporting fragile articles, said belts having intersecting courses of travel and arranged with their adjacent conveying surfaces contiguous at the intersection, the surface of one belt traveling in a plane below that of the other belt, of deflector rollers of relatively soft elastic material disposed approximately normal to the surfaces of the belts in a substantially arcuate path extending at the intersection of the courses of travel across the upper belt, means for causing the belts to travel at a predetermined speed and means for rotating the rollers at a greater relative speed whereby the articles traveling on the upper belt and deflected by the rollers are rotated upon their vertical axes so that they continue their travel on the lower belt in the same relative relation as they occupied on the upper belt.

5. The combination with a conveyer belt for transporting fragile articles of deflector rollers of relatively soft elastic material disposed approximately normal to the surface of the belt in a substantially arcuate path extending across the belt, means for causing the belt to travel at a predetermined speed, and means for rotating the rollers at a greater relative speed whereby the articles deflected by the rollers are rotated upon their vertical axes so that they leave the belt in the same relative relation as they occupied on the belt.

6. The combination with conveyer belts having intersecting courses of travel of deflector rollers by which articles transported by one belt are guided to the other belt, said rollers being disposed approximately normal to the surfaces of the belts in a substantially arcuate path extending at the intersections of the courses of travel across the first named belt and along the side of the other belt and an endless belt which frictionally bears upon and rotates the rollers whereby the articles advanced by the first belt are transferred to the second belt.

7. The combination with conveyer belts having intersecting courses of travel of deflector rollers by which articles transported by one belt are guided to the other belt, said rollers being disposed approximately normal to the surfaces of the belts in a substantially arcuate path extending at the intersections of the courses of travel across the first named belt and along the side of the other belt and an endless belt, which bears upon the outer surfaces of the rollers and is constrained thereby to follow the arcuate path, for rotating said rollers whereby the articles advanced by the first belt are transferred to the second belt.

8. The combination with conveyer belts having intersecting courses of travel of deflector rollers by which articles transported by one belt are guided to the other belt, said rollers being disposed approximately normal to the surfaces of the belts in a substantially arcuate path extending at the intersections of the courses of travel across the first named belt and along the side of the other belt, means for causing the belts to travel at a predetermined speed and means for rotating the rollers at a greater relative speed whereby the articles transported by the first belt and deflected by the rollers are rotated upon their vertical axes so that they continue their travel on the second belt in the same relative relation which they occupied on the first belt.

Signed by me at Syracuse, N. Y. this 1st day of Nov. 1930.

LAVONT C. ALLEN.